Patented Sept. 14, 1954

2,689,219

UNITED STATES PATENT OFFICE 2,689,219

EMULSION DRILLING FLUID

Paul L. Menaul, Tulsa, Okla., assignor to Stanolind Oil and Gas Company, Tulsa, Okla., a corporation of Delaware No Drawing. Application February 11, 1952,
Serial No. 271,075

16 Claims. (Cl. 252—8.5)

This invention relates to the art of drilling fluids for drilling, completing, and otherwise servicing wells. More particularly, it relates to emulsion drilling fluids of the water-in-oil type.

Water-in-oil emulsion drilling fluids have been previously prepared to obtain most of the benefits of oil-base drilling fluids at a lower cost. In preparing and employing these emulsions, however, several difficulties have been encountered. One of the principal difficulties arises from water contamination, which almost invariably occurs during drilling operations. The contaminating water produces a change in the water-to-oil ratio in the emulsion which often causes instability or even inversion of the emulsion. This undesirable condition can be partially avoided by using emulsions containing more water than oil. However, few emulsifiers are effective to form water-in-oil emulsions with more water than oil.

If a water-in-oil emulsion contains a high percentage of oil and little water, the density will approach that of the oil. Thus, weighting materials must be added to the oil to increase the mud density. However, the formation of a stable suspension of weighting materials in oil is not a simple matter. If, on the other hand, an emulsion could be prepared containing at least as much water as oil, then the density would be more nearly that of water and less weighting material would be required. If a greater density was found to be desirable, the aqueous phase could be easily thickened with clay to support a weighting material in this phase. The problem, again, is to form a water-in-oil emulsion containing at least as much water as oil.

Another difficulty is contamination of the emulsion drilling fluids by the salts in the formation brines. These salts are strong electrolytes and tend to break many emulsions. In some cases the salts react with the emulsifiers to precipitate the latter or otherwise render them ineffective.

For reasons of economy, convenience, and compatibility with well fluids, it is often desirable to employ crude oil as the non-aqueous phase. Crude oil, however, frequently contains natural emulsifying agents which tend to form oil-in-water type emulsions. If the aqueous phase is thickened with bentonite clays, which is usually desirable, the tendency to form an oil-in-water emulsion is even greater. Thus, the water-in-oil emulsifier must be able to overcome not only the natural tendency for the most abundant water phase to be the continuous one, but must also overcome the positive action of the bentonite and crude-oil emulsifiers which tend to form the opposite type of emulsion. Most water-in-oil emulsifiers have been found to be incapable of such action.

A drilling fluid must be pumped through thousands of feet of drill pipe or tubing in well drilling, completion, workover, or other well-servicing operations. It is well known that many of the stable emulsions which are the water-in-oil type, are hard greases which cannot be pumped through long lengths of pipe. While the emulsion drilling fluid must be stable, it must also have a sufficiently low viscosity to permit pumping of the emulsion through long distances of pipe without excessive pressure requirements. On the other hand, few emulsion drilling fluids have any gel strength at all. Accordingly, they must rely solely upon viscosity to carry bit cuttings out of the well or to maintain them suspended if circulation stops. Few emulsifiers can form emulsions which meet these strict viscosity requirements.

Fluid loss is an important property of all drilling fluids. Oil-in-water emulsions can be easily treated to reduce fluid loss since water is the exterior phase in contact with the formations. In water-in-oil emulsions, however, oil is the continuous phase so the character of the emulsion itself must be relied on to obtain low fluid loss. It will thus be seen that the emulsifier employed should be capable of forming an emulsion having a low fluid loss.

With the above problems and difficulties in mind, it is a principal object of this invention to provide a method of drilling, completing, or otherwise servicing a well in which a stable water-in-oil emulsion drilling fluid is employed which contains at least as much water as oil, and which is relatively insensitive to water contamination.

Another object of the invention is to provide a method for servicing a well in which the drilling fluid employed is a water-in-oil emulsion insensitive to salt contamination.

Still another object of the invention is to provide a method for servicing a well in which the drilling fluid employed is a water-in-oil emulsion prepared with an emulsifying agent strong enough to overcome the natural tendencies of crude oil emulsifiers, bentonite, and high water content to form the opposite type of emulsion.

An additional object of the invention is to provide a method for servicing a well in which the water-in-oil type emulsion drilling fluid employed has a viscosity sufficiently low to permit easy pumping through several thousand feet of drill pipe or tubing, but which is high enough to carry out bit cuttings.

Still another object of the invention is to provide a method for servicing a well wherein a water-in-oil emulsion drilling fluid is employed which has a low filtrate rate.

Other objects will be apparent to those skilled in the drilling fluid art, and still others will appear from consideration of the following description:

In general, I accomplish the objects of my invention by employing as emulsifying agents a class of oil-soluble, non-ionic, surface-active agents having a sufficient number of polar groups to give such agents slight hydrophilic properties.

A preferred example of the class of emulsifying agents which I propose to employ, is the monooleate of sorbitol wherein the sorbitol portion of the molecule has been dehydrated to form a five or six member cyclic ether. This material is usually referred to as anhydrosorbitol monooleate and can be obtained at present as Span 80. Another example is sorbitol tetraoleate, to which a polyoxyethylene chain has been added through an ether linkage with one of the remaining unesterified hydroxyl groups. This material is commonly called polyoxyethylene sorbitol tetraoleate, and is available as Atlas G-2854.

In preparing a drilling fluid according to this invention, the emulsifier is usually first dissolved in the oil phase. The aqueous phase, containing any desired additives, such as thickening materials, weighting agents or salt, is then stirred into the solution of oil and emulsifier.

For example, an emulsion drilling fluid containing 60 volume per cent of aqueous phase, and 40 volume per cent of oil phase was prepared employing anhydrosorbitol monooleate (Span 80) as the emulsifier in an amount equal to 8 pounds per barrel of emulsion. The emulsifier was first dissolved in No. 2 fuel oil, which was used as the oil phase. The aqueous phase which was a saturated solution of sodium chloride, was then mixed in with agitation. Limestone ground to pass a 325 mesh screen, was then added in an amount equal to 20 pounds per barrel of emulsion. The addition of limestone to the emulsion served to increase the plastering ability and weight of the emulsion as well as to improve the viscosity and stability thereof. The viscosity of the resulting emulsion was 74 centipoises. The fluid loss, as measured by the API test, was 2.3 ml. in 30 minutes under 100 p. s. i. g. pressure differential. For a description of this test, see API Code No. 29, second edition, July 1942 (tentative). Upon standing, it was noted that an oil layer tended to form on the surface, but the aqueous phase and the solids remained well suspended and adequate stability for drilling purposes was maintained.

More stable emulsions were formed using fresh water and by employing higher water-to-oil ratios. For example, an emulsion of 100 parts No. 2 fuel oil and 100 parts of an aqueous phase containing 5 per cent bentonite was prepared employing about 4 pounds of anhydrosorbitol monooleate per barrel of emulsion as emulsifier. This emulsion was not sufficiently stable for use as a drilling fluid. An additional 50 parts of the 5 per cent aquagel phase was mixed into the emulsion, reducing the emulsifier content to about 3.2 pounds per barrel. In spite of the reduction in emulsifier content, the water contamination, which increased the water phase content of the emulsion to about 60 per cent by volume, actually increased the stability of the emulsion sufficiently to permit its use as a drilling fluid. Further contamination by 50 parts of water, decreasing the emulsifier content to about 2.7 pounds per barrel, and increasing the water phase content to about 67 per cent by volume, further stabilized the drilling fluid.

From the above examples, it will be apparent that these emulsions will fulfill the requirements of my method. The emulsions contain more water than oil and, at water phase contents of about 60 per cent, further water contamination not only fails to cause difficulty but actually increases the stability of the drilling fluid. Weighting materials, such as 325 mesh ground limestone, can be added in fairly large amounts up to about 100 pounds per barrel (20 pounds per barrel in the example). Salt contamination can cause no troubles when the aqueous phase is already saturated with salt. The emulsion is of the water-in-oil type, which protects producing formations and bit cuttings from contact with the water. Inversion to the oil-in-water type occurs only at water concentrations above about 80 per cent by volume. The viscosity of the emulsion appears high compared to ordinary water-base mud viscosities. However, the apparent high viscosity is not objectionable since the exterior oil phase appears to lubricate the emulsion, permitting it to be pumped easily through long lengths of tubing. Actually, the optimum viscosity has been found to be approximately 80 centipoises, although viscosities from about 40 to as high as 150 centipoises have been found to be quite operable.

The extremely low fluid loss of the emulsion prevents serious contamination of the formation when it is remembered that this filtrate is partly oil and that the aqueous phase may be already saturated with salt, it will be seen that the problem of contaminating oil producing formations with fresh water has been substantially overcome.

The examples specify rather definite emulsifiers, water-to-oil ratios, and solids and salt contents. These, of course, can be varied considerably within the spirit of my invention. The emulsifiers, for example, can be classed broadly as partial esters of polyhydric alcohols in which the esterifying acids are carboxylic acids containing at least twelve carbon atoms per molecule. The emulsifier must be oil-soluble to insure the formation of a water-in-oil type emulsion.

Polyhydric alcohols suitable for esterifying to form emulsifiers for my purposes are: ethylene glycol, polyethylene glycols, glycerol, tetrahydric alcohols such as erythritol, pentrahydric alcohols such as arabitol and xylitol, hexahydric alcohols such as sorbitol and mannitol and polyhydric alcohols containing more than six hydroxy groups. Another group of polyhydric alcohols comprises the monosaccharides such as sorbose, mannose, glucose, arabinose, xylose, erythrose and glyceraldehyde, although the last two frequently are not referred to as monosaccharides. Other polyhydric alcohols such as pentaerythritol may also be esterified to produce suitable emulsifying agents for my purposes.

Although the term "oil soluble" is employed, I have found that there is a very indistinct line of demarcation between oil-soluble and oil-dispersible materials. When the term "oil-soluble" is employed hereinafter, it should be understood that I intend to include materials which are sufficiently oil dispersible to permit maintaining the desired concentration of dissolved or dispersed emulsifier permanently in the oil phase.

According to some authors, water-in-oil emulsions are characterized by a relatively solid or plastic film around the water droplets (Surface Active Agents, by Schwartz and Perry; Interscience Publishers, Inc.; New York; 1949; p. 348). If this is true, then the use of oil-dispersible solid emulsifiers might have some advantages over the use of truly oil-soluble materials.

Of these emulsifiers, the derivatives of sorbitol have been found to be most desirable. In particular, the partial esters of sorbitol which have been dehydrated to form one or more cyclic ether rings, have been found to be the preferred embodiments of emulsifiers in my invention.

With regard to the desirable concentrations of an emulsifier, it has been found that at least about 2.5 pounds per barrel of emulsion should be employed in order to reduce the filtrate rate of the emulsion to a reasonably low value. A preferable minimum amount is about 5 pounds per barrel of emulsion. The upper limit of concentration of the emulsifier is controlled principally by viscosity considerations. Concentrations in the range of 10 pounds per barrel should not be greatly exceeded in order to avoid high viscosity problems. The barrel on which these concentrations are based is a 42 gallon barrel.

As indicated in the examples, if the water phase is present in a concentration of less than 50 per cent by volume, the resulting emulsion is not sufficiently stable for use as a drilling fluid. The minimum limit of water phase to be employed to insure adequate stability is about 60 per cent by volume. The upper limit of water concentration should not be much greater than 80 per cent by volume since concentrations thereof above that level tend to cause the emulsion to invert to the oil-in-water type.

The water phase should preferably contain some solids. For low salt content muds, bentonite is satisfactory. Bentonite is also satisfactory for use in high salt content muds, however, in this case, it is not greatly hydrated but acts in much the same manner as ground limestone to increase the weight and plastering properties of the emulsion. Other weighting or plastering materials, such as barites and work-over clay can also be employed with advantage.

The aqueous phase may or may not contain salts. Salts have certain advantages, however, which make their use highly desirable. For example, if the water phase is approximately saturated with sodium chloride or some other salt, shale hydration by the brine is practically eliminated even though the shale particles manage to penetrate the exterior continuous oil phase. Thus, contamination of the drilling fluid with shale is avoided. The presence of salt in the filtrate water will also help prevent hydration of the shale in the formation. As mentioned before, another advantage of the salt is that if a brine is employed in the emulsion, then brine contamination of the emulsion can have little effect on the properties thereof.

The use of sodium chloride has been specifically mentioned. Other salts, such as potassium chloride, calcium chloride, barium chloride, strontium chloride and magnesium chloride or the nitrates or other water-soluble salts of these metals may be employed. In general, water-soluble salts of the alkali metals and alkaline earth metals have been found to be satisfactory. If a salt is to be employed in the water phase, an amount equal to about 5 per cent by weight of the water phase should be employed. Smaller amounts, of course, can be employed but very little effect is produced until about 5 per cent by weight of the salt is present. Preferably, the aqueous phase should be approximately saturated with the salt. In order to maintain the aqueous phase in a saturated condition, I have found it convenient to maintain solid salt in contact with the mud in the mud pits or tanks. A final advantage of the presence of salts that should not be ignored, is that by employing saturated salt solutions, the density of the aqueous phase can be increased by approximately 20 per cent.

The range of oil phase concentration has already been indicated indirectly in the discussion of the water phase. Oil is simply employed in an amount necessary to make the difference between the per cent of water employed and 100 per cent. Thus, the oil concentration should be from 20 to 40 volume per cent of the emulsion. Regarding the nature of the oil, it has been found that a refined oil is preferable to crude oil although most crudes are operable in the preparation of my emulsion drilling fluids. The use of No. 2 fuel oil has been found to be particularly desirable since it is a relatively heavy oil without light ends but is still sufficiently low in viscosity so that if the oil is lost as filtrate into the formation, it can flow out again easily when the well is put into production. The use of a refined oil permits control of the external phase of the emulsion which governs many of the emulsion properties. For example, the presence of unknown emulsifiers which often occur in crude oils is avoided. The use of a refined oil also results in a cleaner appearing mud due to the absence of natural asphalts and bituminous materials and the like. However, a drilling fluid prepared with most crudes is fairly light in color and unobjectionable to work with. Although emulsions prepared with inflammable hydrocarbons have been found to present very little fire hazard due to the presence of large volumes of the water phase, fire dangers can be further reduced by the selection of refined oil fractions having low flash points.

It will be understood that while specific examples and theories have been presented, I do not wish to be limited by these examples and theories. My invention should, rather, be limited only by the claims.

I claim:

1. A method for servicing a well comprising circulating in said well, a water-in-oil emulsion drilling fluid including 60 to 80 per cent by volume of an aqueous phase, 20 to 40 per cent by volume of oil, and 2 to 10 pounds per barrel of drilling fluid, of an oil-soluble, non-ionic emulsifier consisting essentially of a partial ester of a polyhydric alcohol and a carboxylic acid, said acid containing at least 12 carbon atoms per molecule.

2. The method of claim 1 in which said polyhydric alcohol is selected from the group comprising sorbitol and the anhydrosorbitols.

3. The method of claim 1 in which said emulsifier is anhydrosorbitol monooleate.

4. The method of claim 1 in which said emulsifier is polyoxyethylene sorbitol tetraoleate.

5. A method for servicing a well comprising circulating in said well a water-in-oil emulsion drilling fluid including about 70 per cent by volume of an aqueous phase, about 30 per cent by volume of an oil phase, and about 5 pounds per barrel of an oil-soluble, non-ionic, partial ester of a polyhydric alcohol and a carboxylic acid, said acid containing at least 12 carbon atoms per molecule.

6. The method of claim 5 in which said oil phase is a refined petroleum fraction at least as high-boiling as kerosene, and said emulsifier is anhydrosorbitol monooleate.

7. A method for servicing a well comprising circulating in said well a water-in-oil emulsion drilling fluid including 60 to 80 per cent by volume of an aqueous phase, containing from 5 per cent to saturation per cent of a salt of a metal selected from the group consisting of alkali metals and alkaline earth metals; 20 to 40 per cent by volume of an oil phase; 2 to 10 pounds per barrel of drilling fluid of an oil-soluble, non-ionic emulsifier consisting essentially of a partial ester of a polyhydric alcohol and a carboxylic acid, said acid containing at least 12 carbon atoms per molecule; and at least 5 pounds per barrel of drilling fluid, of a water-insoluble and oil-insoluble solid.

8. The method of claim 7 in which said polyhydric alcohol is selected from the group consisting of sorbitol and the anhydrosorbitols.

9. The method of claim 7 in which said emulsifier is anhydrosorbitol monooleate.

10. The method of claim 7 in which said emulsifier is polyoxyethylene sorbitol tetraoleate.

11. A method for servicing a well comprising circulating in said well a water-in-oil emulsion drilling fluid including 60 to 80 per cent by volume of an aqueous phase containing from 5 per cent to saturation per cent of sodium chloride; 20 to 40 per cent by volume of a refined petroleum fraction at least as high-boiling as kerosene; 2 to 10 pounds, per barrel of drilling fluid, of anhydrosorbitol monooleate; and at least 5 pounds per barrel of bentonite.

12. A method for servicing a well comprising circulating in said well a water-in-oil emulsion drilling fluid including about 70 per cent by volume of an aqueous phase approximately saturated with a salt of a metal selected from the group comprising alkali metals and alkaline earth metals; about 30 per cent by volume of an oil phase; about 5 pounds per barrel of a partial ester of a polyhydric alcohol and a carboxylic acid, said acid containing at least 12 carbon atoms per molecule; and about 20 pounds per barrel of drilling fluid of a water-insoluble and oil-insoluble solid.

13. A method for serving a well comprising circulating in said well, a water-in-oil emulsion drilling fluid including about 70 per cent of an approximately saturated aqueous solution of sodium chloride; about 30 per cent by volume of diesel fuel, about 5 pounds per barrel of anhydrosorbitol monooleate, and about 20 pounds per barrel of bentonite.

14. A water-in-oil emulsion drilling fluid comprising 60 to 80 parts by volume of water, 20 to 40 parts by volume of oil and 2 to 10 pounds per barrel of drilling fluid, of an oil-soluble, non-ionic emulsifier consisting essentially of a partial ester of a polyhydric alcohol and a carboxylic acid, said acid containing at least 12 carbon atoms per molecule.

15. The drilling fluid of claim 14 in which said emulsifier is anhydrosorbitol monooleate.

16. A water-in-oil emulsion drilling fluid comprising from 60 to 80 parts by volume of water containing from 5 per cent to saturation per cent of a salt of metal selected from the group consisting of alkali metals and alkaline earth metals; 20 to 40 parts by volume of oil; 2 to 10 pounds per barrel of drilling fluid, of an oil-soluble, non-ionic emulsifier consisting essentially of a partial ester of a polyhydric alcohol and a carboxylic acid, said acid containing at least 12 carbon atoms per molecule; and at least 5 pounds of solids per barrel of drilling fluid.

References Cited in the file of this patent

UNITED STATES PATENTS

| Number | Name | Date |
| --- | --- | --- |
| 2,009,825 | Rolshausen et al. | Nov. 23, 1937 |
| 2,151,029 | Henst | Mar. 21, 1939 |
| 2,497,398 | Dawson | Feb. 14, 1950 |
| 2,542,019 | Fischer | Feb. 20, 1951 |
| 2,582,323 | Fischer | Jan. 15, 1952 |

OTHER REFERENCES

Drug and Cosmetic Emulsions, pub. 1947, Atlas Powder Co. of Wilmington, Delaware, page 35.